US011272243B2

(12) United States Patent
Hu

(10) Patent No.: US 11,272,243 B2
(45) Date of Patent: Mar. 8, 2022

(54) CLOUD RECORDING SYSTEM, CLOUD RECORDING SERVER AND CLOUD RECORDING METHOD

(71) Applicants: ThroughTek Technology (ShenZhen) Co., Ltd., Shenzhen (CN); ThroughTek Co., Ltd., Taipei (TW)

(72) Inventor: Chien-Piao Hu, Taipei (TW)

(73) Assignees: THROUGHTEK TECHNOLOGY (SHENZHEN) CO., LTD., Shenzhen (CN); THROUGHTEK CO., LTD., Taipei (TW)

(*) Notice: Subject to any disclaimer, the term of this patent is extended or adjusted under 35 U.S.C. 154(b) by 0 days.

(21) Appl. No.: 15/629,762

(22) Filed: Jun. 22, 2017

(65) Prior Publication Data

US 2018/0007419 A1    Jan. 4, 2018

(30) Foreign Application Priority Data

Jul. 1, 2016   (TW) ................................ 105120891

(51) Int. Cl.
*H04N 21/433*    (2011.01)
*H04N 21/274*    (2011.01)
(Continued)

(52) U.S. Cl.
CPC ..... *H04N 21/4334* (2013.01); *H04N 21/2343* (2013.01); *H04N 21/23106* (2013.01); *H04N 21/274* (2013.01); *H04N 21/2747* (2013.01)

(58) Field of Classification Search
CPC ......... H04N 21/4334; H04N 21/23106; H04N 21/2343; H04N 21/274; H04N 21/2747;
(Continued)

(56) References Cited

U.S. PATENT DOCUMENTS 5,561,457 A * 10/1996 Cragun ............... G06F 16/7844
                                                    725/137
5,859,662 A *  1/1999 Cragun ............... G06F 16/7844
                                                    725/137
(Continued)

FOREIGN PATENT DOCUMENTS

CN       2932875 Y  *  8/2007
CN       2932875 Y     8/2007
(Continued)

OTHER PUBLICATIONS

N. Oza and N. B. Gohil, "Implementation of cloud based live streaming for surveillance," 2016 International Conference on Communication and Signal Processing (ICCSP), Melmaruvathur, 2016, pp. 0996-0998, doi: 10.1109/ICCSP.2016.7754297. (Year: 2016).*

*Primary Examiner* — Cynthia M Fogg
(74) *Attorney, Agent, or Firm* — Min-Lee Teng; Litron Patent & Trademark Office

(57) ABSTRACT

A cloud recording system, a cloud recording server, and a cloud recording method are provided. The cloud recording system includes an image source device, a recording device, and a remote storage device. The image source device provides an audiovisual streaming data. The recording device is used for receiving the audiovisual streaming data. The recording device stores at least one recording time parameter and includes a capture unit and a conversion unit. The capture unit is used for capturing a partial audiovisual streaming data in accordance with the recording time parameter. The conversion unit is used for converting the partial audiovisual streaming data into a captured file. The recording device is configured to transmit the captured file to the external of the recording device. The remote storage device is connected to the recording device and is used for receiving and keeping the captured file.

16 Claims, 7 Drawing Sheets

(51) Int. Cl.
*H04N 21/231* (2011.01)
*H04N 21/2343* (2011.01)
*H04N 21/2747* (2011.01)

(58) Field of Classification Search
CPC .. H04N 5/76; H04N 21/2187; H04N 21/4147; H04N 21/43622; H04N 21/4135; H04L 67/025; H04L 67/1097
USPC ........................................................ 725/115
See application file for complete search history.

(56) References Cited

U.S. PATENT DOCUMENTS

| | | | |
|---|---|---|---|
| 6,580,437 B1* | 6/2003 | Liou | G06F 16/7844 715/719 |
| 6,591,058 B1* | 7/2003 | O'Connor | G11B 27/034 386/248 |
| 6,798,912 B2* | 9/2004 | Devara | G06F 16/7844 382/229 |
| 7,460,149 B1* | 12/2008 | Donovan | G11B 27/105 348/143 |
| 7,467,398 B2* | 12/2008 | Fellenstein | H04N 7/163 348/E7.061 |
| 7,688,203 B2* | 3/2010 | Rockefeller | G08B 13/19684 340/541 |
| 9,813,777 B1* | 11/2017 | Nijim | H04N 21/234363 |
| 9,986,209 B2* | 5/2018 | Meyer | G08B 13/19671 |
| 2003/0093814 A1* | 5/2003 | Birmingham | H04N 7/17318 725/136 |
| 2006/0234769 A1* | 10/2006 | Srinivasan | H04M 1/0202 455/556.1 |
| 2006/0242678 A1* | 10/2006 | Kostadinovich | H04N 5/76 725/105 |
| 2007/0027844 A1* | 2/2007 | Toub | G11B 27/105 |
| 2008/0002938 A1* | 1/2008 | Osborne | H04N 5/91 386/46 |
| 2008/0074540 A1* | 3/2008 | Liu | H04N 5/76 348/474 |
| 2008/0198268 A1* | 8/2008 | Tullberg | H04N 5/23203 348/659 |
| 2008/0199155 A1* | 8/2008 | Hagens | H04N 21/43615 386/291 |
| 2008/0313146 A1* | 12/2008 | Wong | G06F 16/78 |
| 2009/0031381 A1* | 1/2009 | Cohen | H04L 29/08846 725/115 |
| 2009/0049481 A1* | 2/2009 | Fellenstein | H04N 7/163 725/53 |
| 2009/0132920 A1* | 5/2009 | Deyo | G06Q 10/06 715/708 |
| 2010/0167687 A1* | 7/2010 | Morrey | H04N 7/18 455/404.1 |
| 2011/0154401 A1* | 6/2011 | Chow | H04N 21/47202 725/49 |
| 2011/0299835 A1* | 12/2011 | Fleming | H04N 5/77 386/280 |
| 2013/0291008 A1* | 10/2013 | Abed | H04N 7/0882 725/32 |
| 2015/0358573 A1* | 12/2015 | Kardashov | H04N 21/26216 348/552 |
| 2016/0088326 A1* | 3/2016 | Solomon | H04N 21/254 725/12 |
| 2016/0360243 A1* | 12/2016 | Arbuckle et al. | H04N 21/23116 |
| 2017/0064378 A1* | 3/2017 | Webster et al. | H04N 21/4334 |
| 2017/0127138 A1* | 5/2017 | Lang | H04N 21/47217 |

FOREIGN PATENT DOCUMENTS

| | | | |
|---|---|---|---|
| CN | 101242505 A | * | 8/2008 |
| CN | 101242505 A | | 8/2008 |
| CN | 203435086 U | * | 2/2014 |
| CN | 203435086 U | | 2/2014 |

* cited by examiner

CLOUD RECORDING SYSTEM, CLOUD RECORDING SERVER AND CLOUD RECORDING METHOD

RELATED APPLICATIONS

This application claims priority to Taiwan patent application, No. 105120891, filed on Jul. 1, 2016, entitled "CLOUD RECORDING SYSTEM, CLOUD RECORDING SERVER AND CLOUD RECORDING METHOD", which is hereby incorporated by reference in its entirely.

BACKGROUND OF THE INVENTION

Technical Field

The present invention relates to a recording system, recording server and recording method. More particularly, the present invention relates to a recording system, recording server and recording method incorporating cloud services.

Description of Related Art

Along with the development of technology, the processing power of electronic devices are getting stronger, the transmission speed of network is increasing drastically, and the storage cost is dropping rapidly. Modern digital products are now more capable of processing digital multimedia contents, and therefore a higher standard for hardware specification can be achieved accordingly. In terms of image quality, early standard-definition images have been replaced with high-definition images; and for audio quality, early low bit-rate audio codecs are now upgraded to high-definition, high bit-rate audio codecs used in modern devices. From the hardware perspective, in order to provide higher quality multimedia contents, previously used analog signal processing technologies have been declined in the digital area; instead, high speed, high-frequency digital signal processing technologies are now widely seen in the market.

Over the past years, the digital content industry has been expanded enormously, and the digital products like set-top boxes, digital video recorders are gaining more and more attention on the market, aiming to provide a more convenient digital life and a richer user experience. However, these digital products mostly store audiovisual materials like movies or TV programs locally in their memories. The amounts of programs that can be saved are limited by the storage size of the digital products. In addition to that, because the control interfaces on the digital products are usually simple, they could not provide the user an efficient way to manage the contents in the digital products. These drawbacks will be troublesome for extensive users and reduce the convenience of using these digital products as well.

SUMMARY

The cloud recording system, cloud recording server, and cloud recording method of the invention are configured to allow the user to set at least one recording time parameter, to capture a partial audiovisual streaming data according to the recording time parameter, and to generate a captured file. The cloud recording system, cloud recording server, and cloud recording method further transmit the captured file to a remote storage device through a communication connection. The captured file can therefore be accessed and used by a third party, so the flexibility and usability of the file can be increased, and the convenience of using the system can be increased as well.

According to one aspect of the invention, a cloud recording system is provided. The cloud recording system includes an image source device, a recording device, and a remote storage device. The image source device is used for providing an audiovisual streaming data. The recording device is connected to the image source device through a first communication connection for receiving the audiovisual streaming data. The recording device stores at least one recording time parameter and includes a capture unit and a conversion unit. The capture unit is used for capturing a partial audiovisual streaming data in accordance with the recording time parameter. The conversion unit is used for converting the partial audiovisual streaming data into a captured file. The recording device is configured to transmit the captured file to the external of the recording device. The remote storage device is connected to the recording device through a second communication connection for receiving and keeping the captured file.

In one embodiment of the cloud recording system, the recording device stores more than one recording time parameters. The recording device further includes a cache unit which is used for caching the audiovisual streaming data received by the recording device. The capture unit is configured to capture the partial audiovisual streaming data out of the audiovisual streaming data cached by the cache unit. Each of the recording time parameters includes a recording time segment. The conversion unit is configured to convert the partial audiovisual streaming data into the captured file in accordance with each of the recording time segments. The captured file is a video file.

In one embodiment of the cloud recording system, the recording device is further configured to delete a remaining audiovisual streaming data from the cache unit after the partial audiovisual streaming data is captured by the captured unit. The remaining audiovisual streaming data situates outside any one of the recording time segments.

In one embodiment of the cloud recording system, each of the recording time segments includes a capture start point and a capture end point. The cloud recording system further includes an event detector that is connected to the recording device through a fourth communication connection for generating an event message as an event occurs. Each of the recording time segments further includes an event occurring point which situates between the capture start point and the capture end point. When the recording device receives the event message, the capture unit captures the partial audiovisual streaming data in accordance with the event occurring point, the capture start point, and the capture end point.

In one embodiment of the cloud recording system, the audiovisual streaming data includes more than one streaming data frames. Each of the streaming data frames includes at least one I-frame, more than one P-frames, and more than one audio frames.

In one embodiment of the cloud recording system, the cloud recording system further includes a setup device which is used for accepting an input of a new recording time parameter to replace the recording time parameter previously stored in the recording device. The new recording time parameter is provided from the setup device to the recording device through a third communication connection.

In one embodiment of the cloud recording system, the recording time parameter previously stored in the recording device includes an event occurring point. The new recording time parameter includes a capture start point and a capture end point. The capture start point is a time point earlier than the event occurring point and the capture end point is another time point later than the event occurring point.

According to another aspect of the invention, a cloud recording method is provided. The method includes the following steps. First, in a receiving step, an audiovisual streaming data is received through a first communication connection. Then in a capturing step, a partial audiovisual streaming data is captured in accordance with at least one recording time parameter. Then in a converting step, the partial audiovisual streaming data is then converted into a captured file. Afterward, in a transmitting step, the captured file is transmitted to a remote storage device through a second communication connection.

In one embodiment of the cloud recording method, in the capturing step, the partial audiovisual streaming data is captured in accordance with more than one recording time parameters. Each of the recording time parameters includes a recording time segment and each of the recording time segments includes a capture start point and a capture end point. The cloud recording method further includes a step of accepting an input of the capture start point and the capture end point.

In one embodiment of the cloud recording method, the method further includes a step of caching the audiovisual streaming data received in the receiving step. The capture start point is a time point earlier than an event occurring point and the capture end point is another time point later than the event occurring point. The capturing step includes the following steps. First, the audiovisual streaming data from the event occurring point to the capture start point is continuously forward captured. Then, the audiovisual streaming data from the event occurring point to the capture end point is continuously backward captured. Moreover, the forward captured audiovisual streaming data and the backward captured audiovisual streaming data are combined to form the partial audiovisual streaming data.

In one embodiment of the cloud recording method, the method further includes a step of deleting a remaining audiovisual streaming data after the partial audiovisual streaming data is captured. The remaining audiovisual streaming data situates outside any one of the recording time segments.

In one embodiment of the cloud recording method, the audiovisual streaming data includes more than one streaming data frames. The partial audiovisual streaming data includes one or more streaming data frames. In the converting step, the partial audiovisual streaming data is converted into a video file.

According to another aspect of the invention, a cloud recording server is provided. The cloud recording server is used for receiving an audiovisual streaming data from an image source device. The server includes a capture unit, a conversion unit, and a communication port. The capture unit is used for capturing a partial audiovisual streaming data in accordance with at least one recording time parameter. The conversion unit is used for converting the partial audiovisual streaming data into a captured file. The communication port is connected to a communication network for receiving the audiovisual streaming data and for transmitting the captured file to a remote storage device.

In one embodiment of the cloud recording server, the capture unit is configured to capture the partial audiovisual streaming data in accordance with more than one recording time parameters. The cloud recording server further includes a cache unit which is used for caching the audiovisual streaming data received by the cloud recording server. The capture unit is configured to capture the partial audiovisual streaming data out of the audiovisual streaming data cached by the cache unit. Each of the recording time parameters includes a recording time segment. The conversion unit is configured to convert the partial audiovisual streaming data into the captured file in accordance with each of the recording time segments. The captured file is a video file.

In one embodiment of the cloud recording server, the cloud recording server is further configured to receive an event message. Each of the recording time segments includes a capture start point, a capture end point, and an event occurring point. The capture start point is a time point earlier than the event occurring point and the capture end point is another time point later than the event occurring point. When the cloud recording server receives the event message, the capture unit captures the partial audiovisual streaming data in accordance with the event occurring point, the capture start point, and the capture end point.

In one embodiment of the cloud recording server, the cloud recording server is further configured to delete a remaining audiovisual streaming data from the cache unit after the partial audiovisual streaming data is captured by the capture unit. Wherein the remaining audiovisual streaming data situates outside any one of the recording time segments.

In one embodiment of the cloud recording server, the cloud recording server is further configured to accept an input of at least one new recording time parameter, so as to replace the recording time parameter previously stored in the cloud recording server.

According to the above-mentioned cloud recording system, cloud recording server, and cloud recording method, the audiovisual streaming data is captured in accordance with the recording time parameter and then converted into the captured file, so as to be transmitted to the remote storage device. The recording behavior can therefore be changed with the settings of the recording time parameter according to the practical needs of the user. The captured file transmitted to the remote storage device can be easily accessed by the third party.

BRIEF DESCRIPTION OF DRAWINGS

The invention can be more fully understood by reading the following detailed description of the embodiment, with reference made to the accompanying drawings as follows.

DETAILED DESCRIPTION

Reference will now be made in detail to elaborate the contents and the features of the embodiments of the present invention, examples of which are illustrated in the accompanying drawings. The cloud recording system of the present embodiments captures the audiovisual streaming data provided from an image source device, converts it into a captured file, and transmits it to a remote storage device so that a third party can easily access and make use of the captured file.

Figure 1:
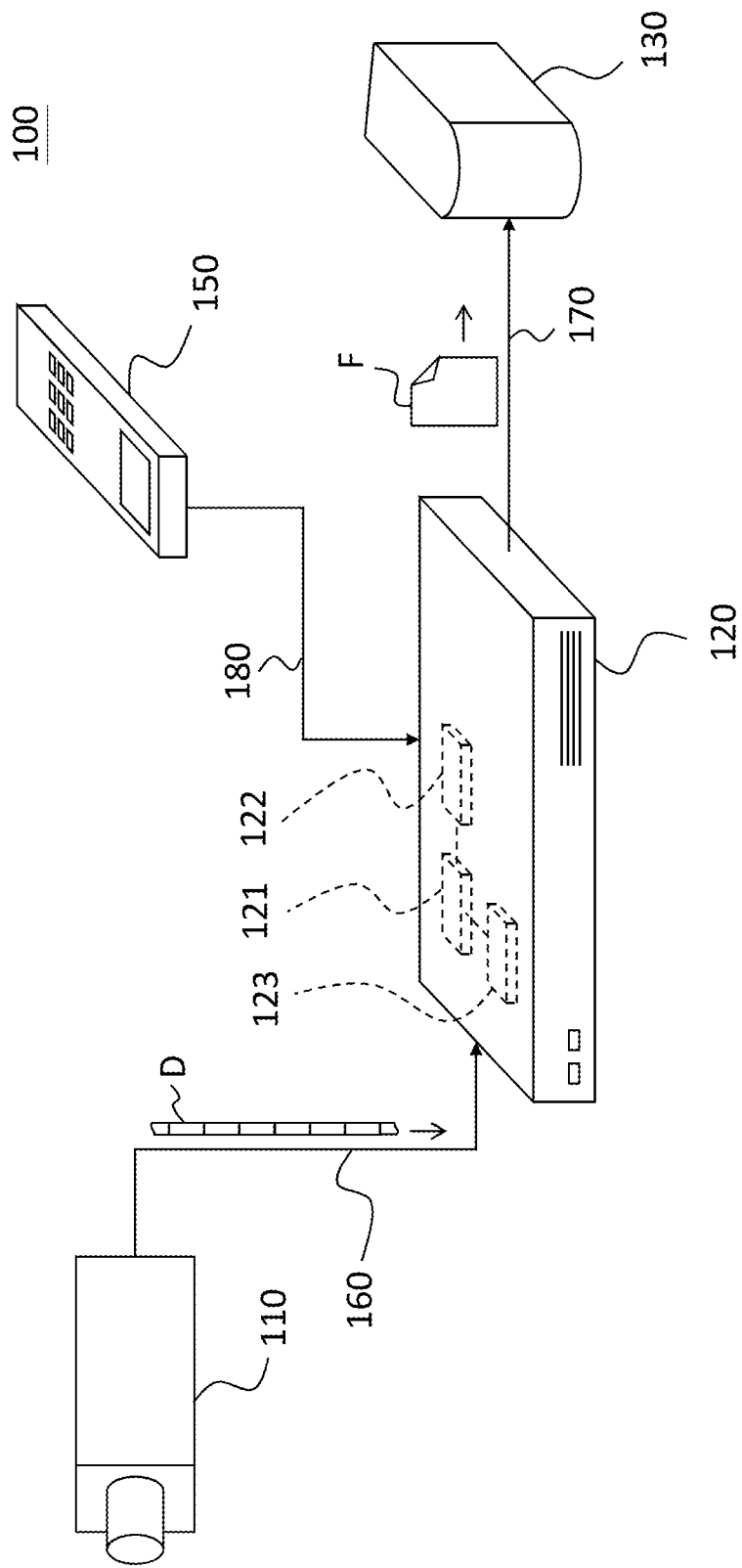
FIG. 1 is a schematic diagram of a cloud recording system according to one embodiment of the invention.

Please refer to FIG. 1, which is a schematic diagram of a cloud recording system according to one embodiment of the invention. The cloud recording system 100 includes an image source device 110, a recording device 120, a setup device 150, and a remote storage device 130. The image source device 110 is configured to provide an audiovisual streaming data D. The recording device 120 is connected to the image source device 110 through a first communication connection 160 for receiving the audiovisual streaming data, and at least one recording time parameter is stored in the recording device 120. The recording device 120 includes a capture unit 121 and a conversion unit 122. The capture unit 121 at least captures a partial audiovisual streaming data in accordance with the recording time parameter. The conversion unit 122 converts the partial audiovisual streaming data into a captured file F. The recording device 120 further transmits the captured file F to the external of the recording device 120. The setup device 150 is used for accepting one or more inputs from the user to set or configure the functions of the cloud recording system 100. The remote storage device 130 is connected to the recording device 120 through a second communication connection 170, so as to receive and keep the captured file F.

The image source device 110 is configured to continuously provide the audiovisual streaming data D. In one embodiment, the image source device 110 begins to provide the audiovisual streaming data D once it is turned on or provided with electric power; which means the audiovisual streaming data D can be provided 24 hours a day continuously. In another embodiment, the image source device 110 provides the audiovisual streaming data D in one or more predetermined time segments. For example, the audiovisual streaming data D can be continuously provided from 8 a.m. to 8 p.m. every day by the image source device 110. The time segments or duration where the audiovisual streaming data D will be provided can be adjusted according to actual needs.

The image source device 110 could be a device that is capable of directly capturing images or a device that receives image data from a remote location. Practically, the image source device 110 may be an audiovisual reproduction device, e.g. a set-top box for cable television, a set-top box for receiving satellite signals, or a multimedia playback device. The image source device 110 may also be a fixed camera and can be installed inside or outside a shop to conduct security surveillance; or, the fixed camera can be installed inside or outside a factory to provide images and audios of the personnel or the equipment. Further, the image source device 110 can also be installed near a road or a bridge to conduct traffic surveillance on pedestrians or vehicles. On the other hand, the image source device 110 may also be a portable camera which can be attached to a vehicle or a user, so as to capture the image and audio of the vehicle or the user, or to capture the image and audio of the surroundings of the vehicle or the user.

Generally, the type of the image source device 110 is not limited in the present invention; in fact, any kind of devices that can provide the audiovisual streaming data D to the recording device 120 through the first communication connection 160 can be used in the embodiments of the invention. In addition, the image source device 110 can be connected to the recording device 120 via wired or wireless connection. For example, the first communication connection 160 may use Bluetooth, infrared communication, Wireless LAN, 3G/4G mobile communication, or other commercially available wireless communication technologies. The first communication connection 160 may also use universal serial bus (USB), wired LAN, or other wired communication protocols. Any kind of communication technology, including point-to-point communication, local area network, wide area network (e.g. the Internet), or other usable digital communications, which enables the transmission of the audiovisual streaming data D from the image source device 110 to the recording device 120, can be useful in the present invention.

Figure 2:
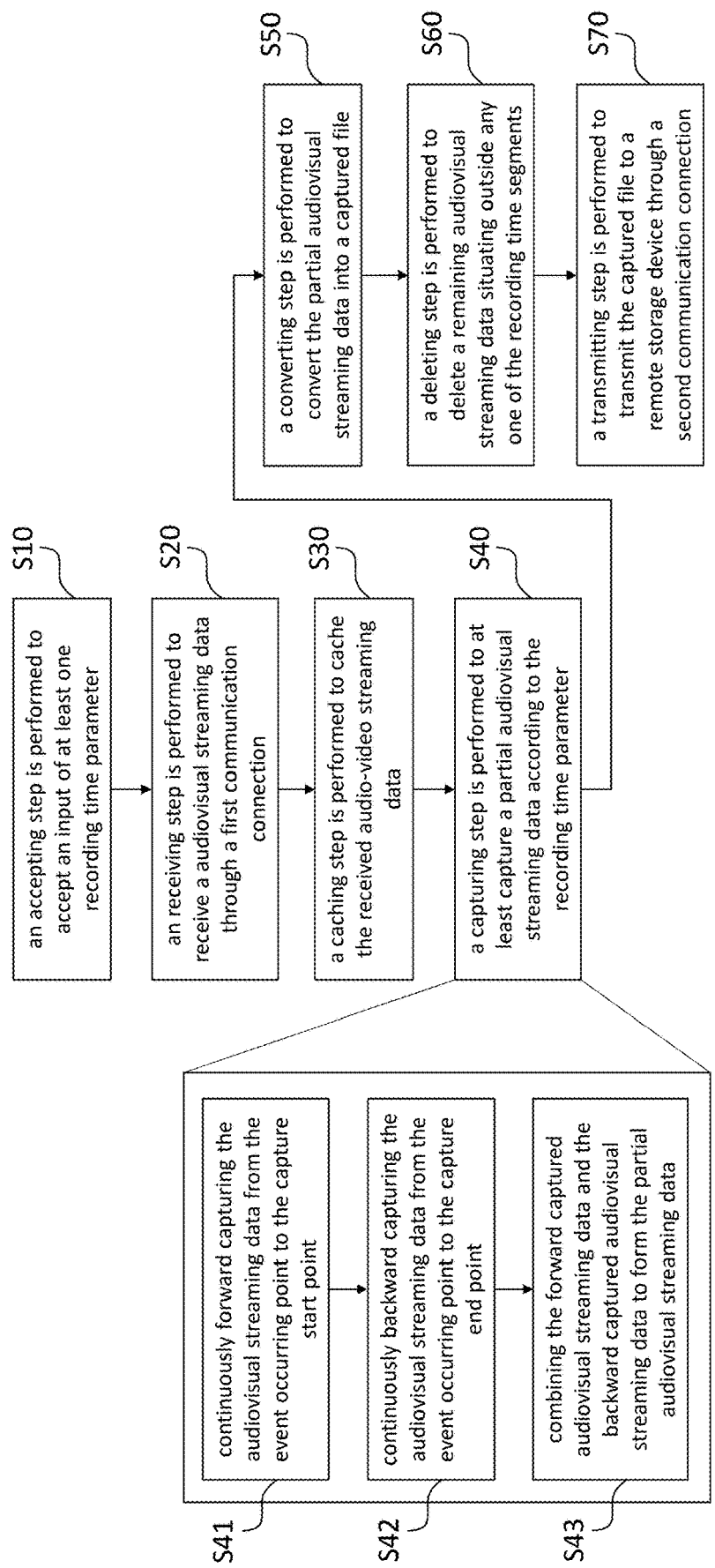
FIG. 2 is a flow chart of a cloud recording method according to one embodiment of the invention.
Figure 3:
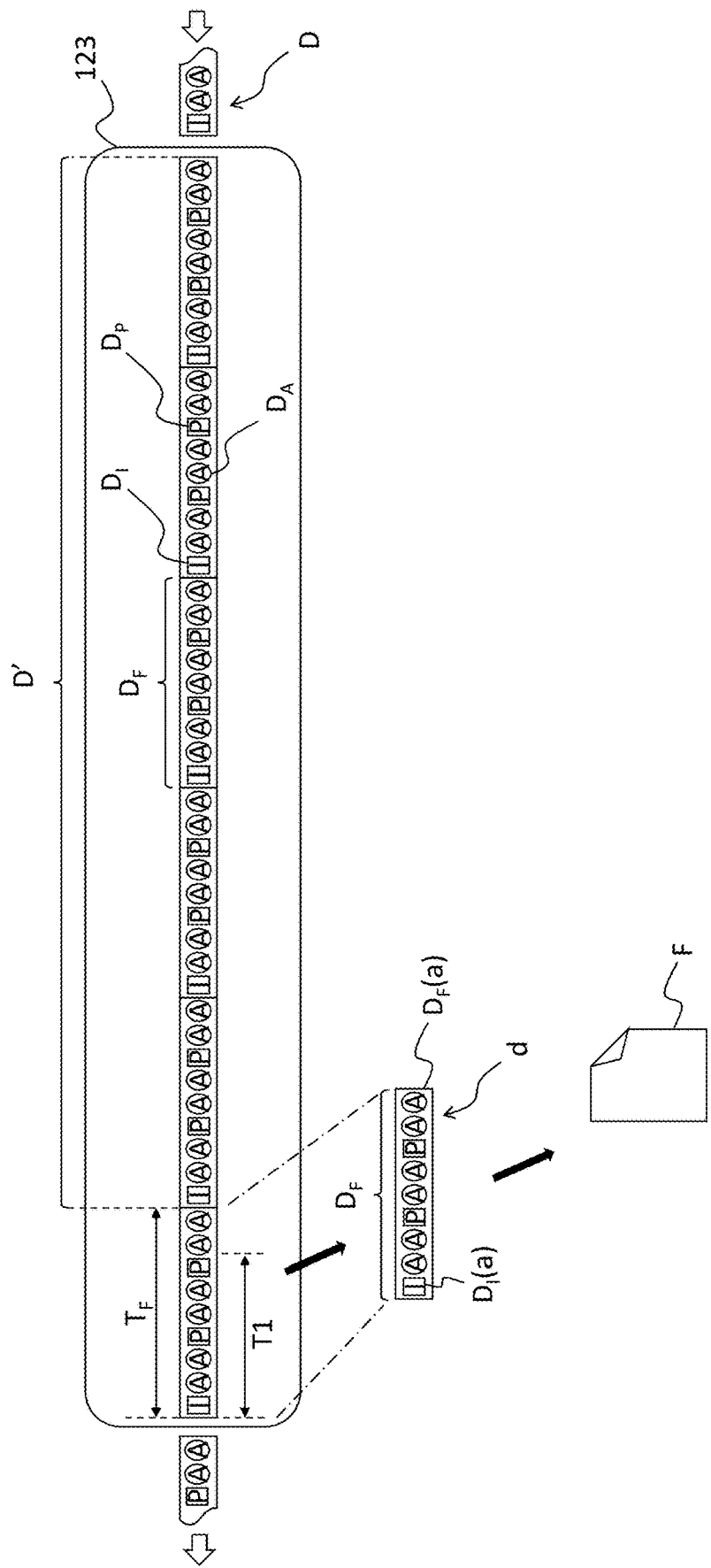
FIG. 3 is a schematic diagram showing one recording behavior of the cloud recording system of FIG. 1 according to one recording time parameter.

The cloud recording system 100 of the present embodiment can be configured to perform a cloud recording method. One embodiment of the cloud recording method will be elaborated in the below with the cloud recording system 100. Please refer to FIG. 1, FIG. 2, and FIG. 3 at the same time. FIG. 2 is a flow chart of a cloud recording method according to one embodiment of the invention. FIG. 3 is a schematic diagram showing one recording behavior of the cloud recording system of FIG. 1 according to one recording time parameter. The audiovisual streaming data D provided by the image source device 110 includes more than one streaming data frames $D_F$, and each of the streaming data frames $D_F$ includes at least one I-frame $D_I$, at least one P-frame $D_P$, and at least one audio frame $D_A$. In the present embodiment, each audiovisual streaming data D contains one I-frame $D_I$, multiple P-frames $D_P$, and multiple audio frames $D_A$. Each streaming data frame $D_F$ has a time stamp that indicates the temporal information related to the streaming data frame $D_F$, such as the start time and the end time of the streaming data frame $D_F$, and a data frame duration $T_F$. The data frame duration $T_F$ indicates the duration in time of the streaming data frame $D_F$.

First, as shown in step S10, an accepting step is performed in the cloud recording method to accept an input of the recording time parameter. The recording device 120 accepts the input of at least one recording time parameter via the setup device 150. The setup device 150 can be used by the user in order to perform function configurations of the cloud recording system 100, such as setting various operational parameters including but not limited to inputting the recording time parameter, setting input video resolution, determining capturing format, and selecting file storage location. The user can input a new recording time parameter through the setup device 150 to replace the previously stored recording time parameter. The setup device 150 is connected to the recording device 120 through a third communication connection 180, so as to provide the recording time parameter to the recording device 120.

The setup device 150 can be exemplified by a remote controller paired with the recording device 120 that utilizes infrared, Bluetooth, Wireless LAN, or other suitable wireless communications as the third communication connection 180, so as to provide the recording time parameter inputted by the user to the recording device 120. However, the setup device 150 is not limited to the above-mentioned remote controller, it can also be exemplified by an intelligent portable device, e.g. a smartphone or a tablet computer. In the present embodiment, the third communication connection 180 may be point-to-point communication, local area network, wide area network (e.g. the Internet), or other usable digital communications. In fact, any kind of communication technology that enables the transmission of at least one recording time parameter from the setup device 150 to the recording device 120 can be useful in the present invention.

According to the previous description, the recording time parameter is provided from the setup device 150 to the recording device 120 through the third communication connection 180 and is stored in the recording device 120. In one embodiment, the recording time parameter can be preset/preinstalled in the recording device 120 upon production in the factory. The recording device 120 may include one or more preset/preinstalled recording time parameters for the user to choose from. Different recording time parameters correspond to different recording behaviors of the recording device 120. The one or more preset/preinstalled recording time parameters can be replaced by way of providing at least one new recording time parameter from the setup device 150; therefore, the user can adjust the recording time parameter and change the recording behavior of the recording device 120 based on actual needs.

Following step S10, the cloud recording method performs a receiving step as shown in step S20. The recording device 120 receives the audiovisual streaming data D provided by the image source device 110 through the first communication connection 160.

Following step S20, the cloud recording method performs a caching step as shown in step S30. The recording device 120 uses a cache unit 123 to cache a certain length of the audiovisual streaming data D. In one embodiment, the cache unit 123 may be random access memory; however, the cache unit 123 may also be other suitable volatile memories. As shown in FIG. 3, the cache unit 123 caches 6 streaming data frames $D_F$ in the present embodiment.

Following step S30, the cloud recording method performs a capturing step as shown in step S40. The recording device 120 captures at least a partial audiovisual streaming data d out of the audiovisual streaming data D cached in the caching unit 123 according to at least one recording time parameter. Each of the recording time parameter includes a recording time segment and each of the recording time segments includes a capture start point and a capture end point.

In one embodiment, the capture start point is a time point earlier than an event occurring point of an event, and the capture end point is another time point later than the event occurring point. However, in another embodiment, the event occurring point overlaps with the capture start point (the two points are the same point); or, in yet another embodiment, the event occurring point overlaps with the capture end point (the two points are the same point). The capture start point and the capture end point can either be preset/preinstalled in the recording device 120 or be inputted by the user. For example, the user can directly set the capture start point which the user wishes to start recording and the capture end point which the user wishes to stop recording. If the user wishes to capture the audiovisual streaming data D from 8 a.m. to 5 p.m., the set capture start point is 8 a.m. and the set capture end point is 5 p.m. The capture start point and the capture end point can be set multiple times, e.g. repeatedly capturing video from 8 a.m. to 5 p.m. every Monday, Wednesday, and Friday. As mentioned in the above, the recording device 120 can be configured to allow the user to directly set the capture start point and the capture end point; or, it can be configured to provide several recording modes for the user to choose from. Different recording modes correspond to different capture start points and different capture end points and correspond to different recording time segments as well.

In the present embodiment, step S40 includes 3 sub-steps, namely: step S41: continuously forward capturing the audiovisual streaming data D from the event occurring point to the capture start point; step S42: continuously backward capturing the audiovisual streaming data D from the event occurring point to the capture end point; and step S43: combining the audiovisual streaming data D forward captured in steps S41 and the audiovisual streaming data D backward captured in step S42 to form the partial audiovisual streaming data d. Details of these steps will later be elaborated in accompany with the cloud recording system of FIG. 5.

Following step S40, the cloud recording method performs a converting step as shown in step S50. The recording device 120 uses the conversion unit 122 to convert the partial audiovisual streaming data d into the captured file in accordance with the recording time segment. According to the configurations of the recording time parameter, the recording time segment could be smaller, larger, or equal to one data frame duration $T_F$. As the embodiment depicted in FIG. 3, the recording time segment T1 is smaller than one data frame duration $T_F$. When the recording time segment T1 is smaller than one data frame duration $T_F$, the capture unit 121 captures the streaming data frame $D_F$ that covers the recording time segment T1. The streaming data frame section $D_F(a)$ that contained in the partial audiovisual streaming data d only includes one streaming data frame $D_F$. The conversion unit 122 converts the captured streaming data frame section $D_F(a)$ into the captured file F, and here the captured file F is a video file.

The captured file F is converted by the conversion unit 122 with a specific format, such as video formats like AVI, MPEG, or RM. The recording device 120 may contain a various of formats for the user to choose from. Further, the conversion unit 122 may capture image from the video file to form an image file based on the built-in settings of the recording device 120 or based on user settings. In the present embodiment, the image contained the image file may be exemplified by the I-frame $D_I(a)$ of the streaming data frame $D_F$ contained in the streaming data frame section $D_F(a)$.

Following step S50, the cloud recording method performs a deleting step as shown in step S60. A remaining audiovisual streaming data D' is deleted in step S60. The remaining audiovisual streaming data D' is a portion of the cached audiovisual streaming data D that situates outside the recording time segment T1. Since each recording time parameter includes one recording time segment, when the recording device 120 stores more than one recording time parameters, the recording device 120 totally includes more than one recording time segments. That is, in the deleting step, the remaining audiovisual streaming data D' which situates outside any one of the recording time segments is deleted. In other words, after the converting step (step S50), the remaining audiovisual streaming data D' that is not captured and does not situate inside any recording time segment can be optionally deleted, so as to spare some rooms in the cache unit 123. The cache unit 123 may continue to receive the audiovisual streaming data D from the image source device 110 afterward.

Following step S60, the cloud recording method performs a transmitting step as shown in step S70. After the partial audiovisual streaming data d (i.e. the streaming data frame section $D_F(a)$ in FIG. 3) is converted into the captured file F by the conversion unit 122 of the recording device 120, the recording device 120 transmits the captured file F to the remote storage device 130. As shown in FIG. 1, the remote storage device 130 is connected to the recording device 120 through the second communication connection 170 for receiving and storing the captured file F. The second communication connection 170 may be local area network or wide area network (e.g. the Internet). The captured file F stored in the remote storage device 130 can be accessed by a third party by way of logging in the remote storage device 130, and the usability or the convenience of using the captured file F can be increased therefrom.

According to the embodiment shown in FIG. 2, the converting step (step S50), the deleting step (step S60), and the transmitting step (step S70) are performed successively in order; however, the cloud recording method of the invention is not limited thereto. For example, the deleting step may be performed before the converting step or performed simultaneously with the converting step. Moreover, the deleting step may be performed after the transmitting step or performed simultaneously with the transmitting step. Any other step technical solutions, in which the remaining audiovisual streaming data D' situating outside any one of the recording time segment is deleted after the partial audiovisual streaming data d is captured, would be considered as falling within the scope of the present invention.

Figure 4:
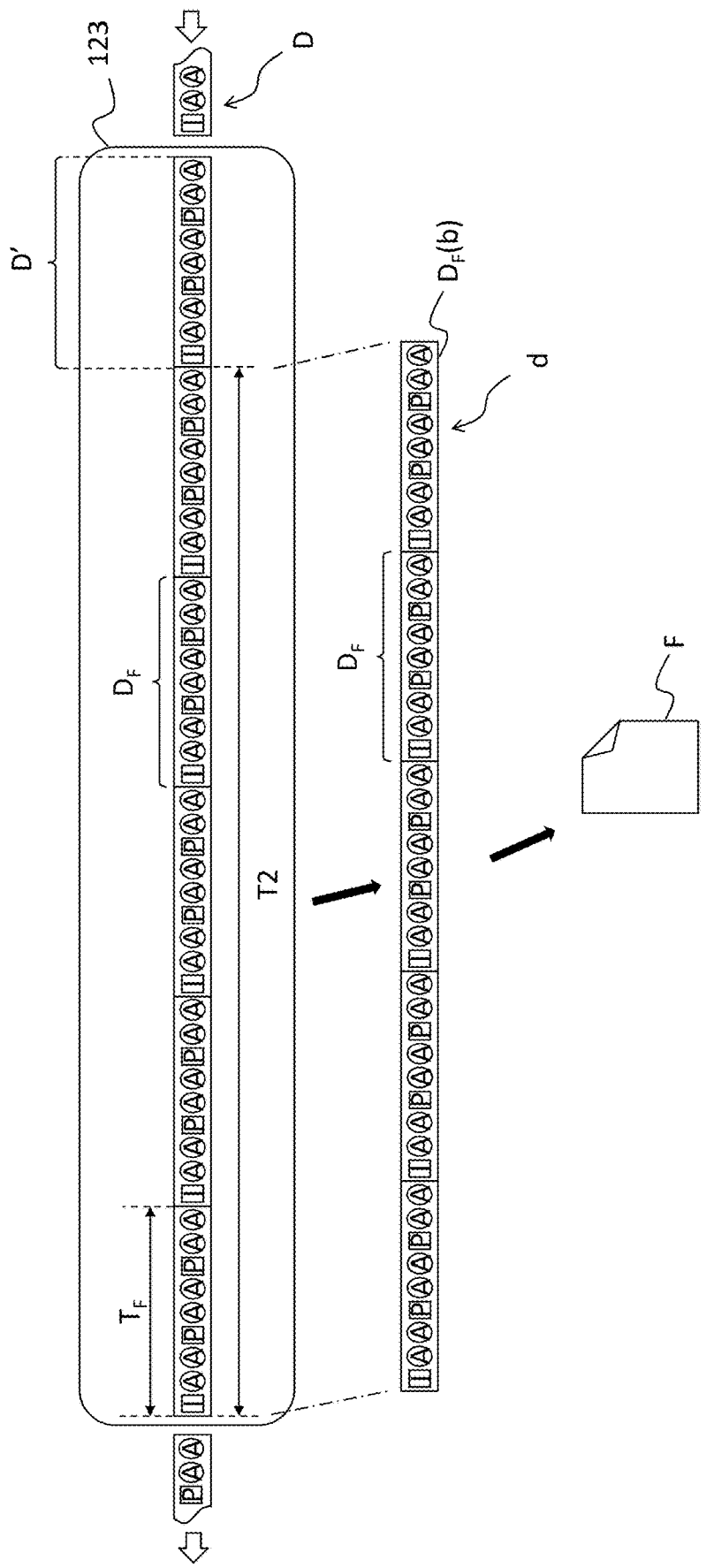
FIG. 4 is a schematic diagram showing another recording behavior of the cloud recording system of FIG. 1 according to another recording time parameter.

Please refer to FIG. 1 and FIG. 4 at the same time. FIG. 4 is a schematic diagram showing another recording behavior of the cloud recording system of FIG. 1 according to another recording time parameter. The differences between the recording behaviors disclosed in FIG. 3 and FIG. 4 at least lie in that the recording time segment T2 included in the recording time parameter of FIG. 4 is larger than one data frame duration $T_F$. When the recording time segment T2 is larger than one data frame duration $T_F$, the capture unit 121 captures two or more streaming data frames $D_F$. As shown in FIG. 4, the streaming data frame section $D_F$(b) that contained in the partial audiovisual streaming data d includes five streaming data frames $D_F$. The conversion unit 122 converts the five captured streaming data frames $D_F$ into the captured file F. Here the captured file F is a video file that corresponds to recording time segment T2.

The recording device 120 may further delete the remaining audiovisual streaming data D' after the captured file F is converted. The remaining audiovisual streaming data D' is a portion of the cached audiovisual streaming data D that situates outside any one of the recording time segment. In other words, the remaining audiovisual streaming data D' that is not captured and does not situate inside any recording time segment can be optionally deleted, so as to spare some rooms in the cache unit 123. The cache unit 123 may continue to receive the audiovisual streaming data D from the image source device 110 afterward.

According to the above-mentioned cloud recording system 100 of the embodiment of the invention, the recording behavior is decided based on the recording time parameter. The converted captured file F is transmitted to the remote storage device 130 so a third party can access, use the captured file F. The usability and flexibility of the cloud recording system 100 can therefore be increased. In the cloud recording system 100, the recording device 120 may store more than one recording time parameters. As described in the above embodiments, the recording device 120 is exemplified by storing two different recording time parameters which are respectively direct to the recording behavior related to the recording time segment T1 shown in FIG. 3 and the recording behavior related to the recording time segment T2 shown in FIG. 4. In other words, FIG. 3 and FIG. 4 can be regarded as embodiments of different recording time parameters of the same cloud recording system 100.

The detail description will now be directed to a cloud recording system according to another embodiment of the invention.

Figure 5:
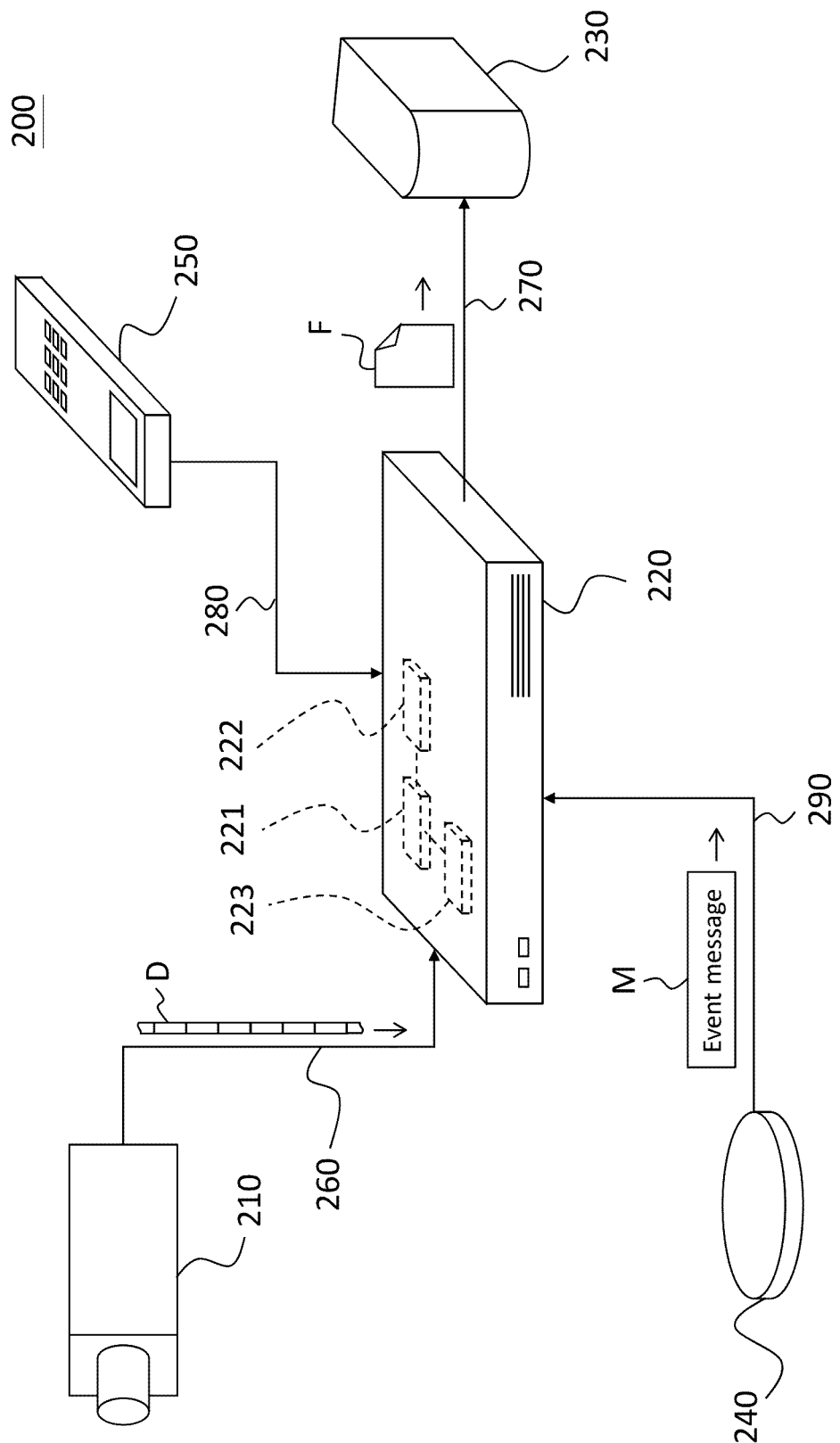
FIG. 5 is a schematic diagram of a cloud recording system according to another embodiment of the invention.

Please refer to FIG. 5, which is a schematic diagram of a cloud recording system according to another embodiment of the invention. The cloud recording system 200 includes an image source device 210, a recording device 220, a remote storage device 230, an event detector 240, and a setup device 250. The recording device 220 includes a capture unit 221, a conversion unit 222, and a cache unit 223. The image source device 210 is connected to the recording device 220 through a first communication connection 260. The recording device 220 is connected to the remote storage device 230 through a second communication connection 270. The setup device 250 is connected to the recording device 220 through a third communication connection 280. The event detector 240 is connected to the recording device 220 through a fourth communication connection 290 and is used to generate an event message M as an event occurs and provide the event message M to the recording device 220.

Figure 6:
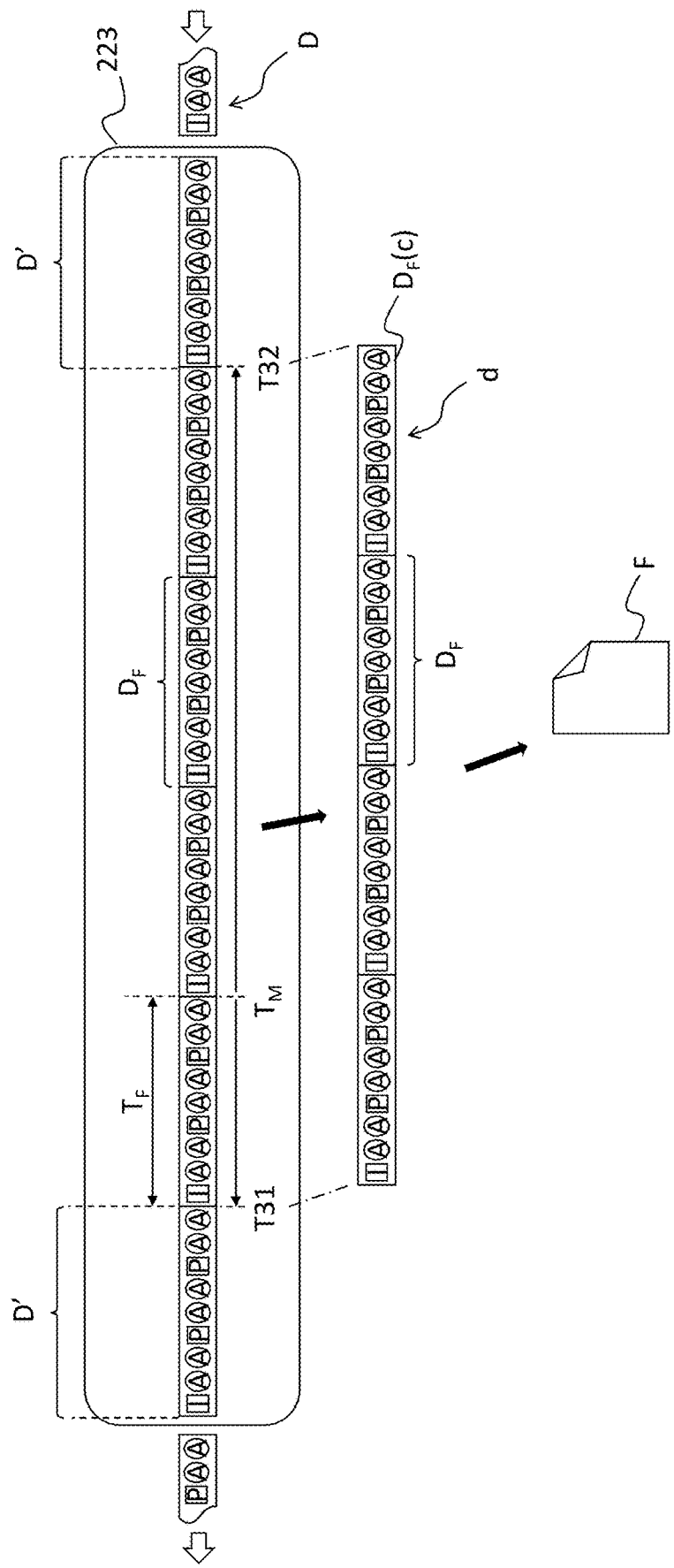
FIG. 6 is a schematic diagram showing yet another recording behavior of the cloud recording system of FIG. 5 according to yet another recording time parameter.

Please refer to FIG. 5 and FIG. 6 at the same time. FIG. 6 is a schematic diagram showing yet another recording behavior of the cloud recording system of FIG. 5 according to yet another recording time parameter. When the recording device 220 receives the event message M, the capture unit 221 captures the partial audiovisual streaming data d according to at least one recording time parameter. Each of the recording time parameter includes a recording time segment, and each recording time segment includes an event occurring point $T_M$, a capture stat point T31, and a capture end point T32. The capture start point T31 is a time point earlier than the event occurring point $T_M$, and the capture end point T32 is another time point later than the event occurring point $T_M$. In the present embodiment, the event occurring point $T_M$ is included in the event message M and is provided by the event detector 240.

In one embodiment, the recording time parameter can be preset/preinstalled in the recording device 220 upon production in the factory. The recording device 220 may include one or more preset/preinstalled recording time parameters for the user to choose from. The one or more preset/preinstalled recording time parameters can be replaced by way of providing at least one new recording time parameter from the setup device 250. Different recording time parameters correspond to different recording behaviors of the recording device 220.

On the other hand, instead of the above-mentioned methods like presetting/preinstalling and manually inputting the recording time parameters, the parameters can be automatically adjusted as well. The recording device 220 may adjust the recording time parameters in accordance with setup values of the other recording devices. For example, the recording device 220 may automatically adjust the recording time parameters upon booting the recording device 220 by referring to the setup values of other recording devices owned by the same user, owned by the same user account, or owned by the same organization.

When the event occurs, the event detector 240 provides the event message M with the event occurring point $T_M$ to the recording device 220. When the recording device 220 receives the event message M, the capture unit 221 continuously forward captures the audiovisual streaming data D from the event occurring point $T_M$ to the capture start point T31, and continuously backward captures the audiovisual streaming data D from the event occurring point $T_M$ to the capture end point T32. Then, the capture unit 221 combines the forward captured audiovisual streaming data D and the backward captured audiovisual streaming data D to form the partial audiovisual streaming data d. In this manner, the partial audiovisual streaming data d from the capture start point T31 to the capture end point T32, i.e. the streaming data frame section $D_F(c)$, is captured by the capture unit 221. As shown in FIG. 6, the streaming data frame section $D_F(c)$ includes four streaming data frames $D_F$. Here in the present embodiment, the captured file F converted by the conversion unit 222 is a video file that begins at the capture start point T31 and ends at the capture end point T32. The recording time segment covers entirely from the capture start point T31 to the capture end point T32.

Practically, the event may be a fire accident, an intrusion event, a burglary event, or other events being constantly monitored with an alert threshold crossed. The event detector 240 may be an alarm or a monitor of the corresponding event. Take the fire alarm as an example. When the heat or smoke is detected, the event detector 240 generates the event message M which includes the event occurring point $T_M$ of the fire (e.g. 3 p.m.). In the case of setting 5 minutes before the event as the capture start point T31 and 10 minutes after the event as the capture end point T32 in the recording time parameter, the capture unit 221 continuously captures the streaming data frames $D_F$ from 2:55 p.m. to 3:10 p.m. as the partial audiovisual streaming data d. The streaming data frames $D_F$ are then converted into the captured file F in video format by the conversion unit 222.

The recording device 220 may further delete the remaining audiovisual streaming data D' after the captured file F is converted. The remaining audiovisual streaming data D' is a portion of the audiovisual streaming data cached in the cache unit 223 that situates outside any one of the recording time segments. Take the recording time segment starting from the capture start point T31 to the capture end point T32 in FIG. 6 as an example. The remaining audiovisual streaming data D' that is not captured and does not situate inside any recording time segment can be optionally deleted, so as to spare some rooms in the cache unit 223. The cache unit 223 may continue to receive the audiovisual streaming data D from the image source device 210.

In the present embodiment, the cloud recording system 200 uses the event detector 240 to generate event message M as the event occurs. When the recording device 220 receives the event message M, it forward captures the streaming data frames $D_F$ to the capture start point T31 and backward captures the streaming data frames $D_F$ to the capture end point T32, so as to convert the captured file F that includes the images before and after the event occurring point $T_M$. As a result, since the related personnel only need to replay, rewind the videos/audios related to the event, the event can be checked and investigated more easily. In another embodiment, the time difference between the event occurring point $T_M$ and the capture start point T31 is 0; that is, the event occurring point $T_M$ is the capture start point T31. In yet another embodiment, the time difference between the event occurring point $T_M$ and the capture end point T32 is 0; that is, the event occurring point $T_M$ is the capture end point T32.

In the present embodiment, the event detector 240 is an external device connected to the recording device 220 through the fourth communication connection 290 as shown in FIG. 5. The fourth communication connection 290 may be local area network, wide area network (e.g. the Internet), or other usable digital communications and is not limited here in the present invention. The event detector 240 is not limited to an externally-connected device; for example, the event detector 240 may also be integrated into the recording device 210.

In the above-mentioned cloud recording system 200, the recording behavior is decided based on the recording time parameter, and one or more recording time parameters can be stored in the recording device 220. Although the recording behavior of the cloud recording system 200 of the present embodiment is exemplified as the one shown in FIG. 6, the recording behaviors of the cloud recording system 200 is not limited thereto. The recording device 220 of the cloud recording system 200 may store more than one recording time parameter at the same time. For example, the recording device 220 may store three different recording time parameters which are respectively direct to the recording behavior related to the recording time segment T1 shown in FIG. 3, the recording behavior related to the recording time segment T2 shown in FIG. 4, and the recording behavior related to the event occurring time point $T_M$ shown in FIG. 6. In other words, Fig, 3, FIG. 4, and FIG. 6 can be regarded as embodiments of different recording time parameters of the same cloud recording system 200.

Figure 7:
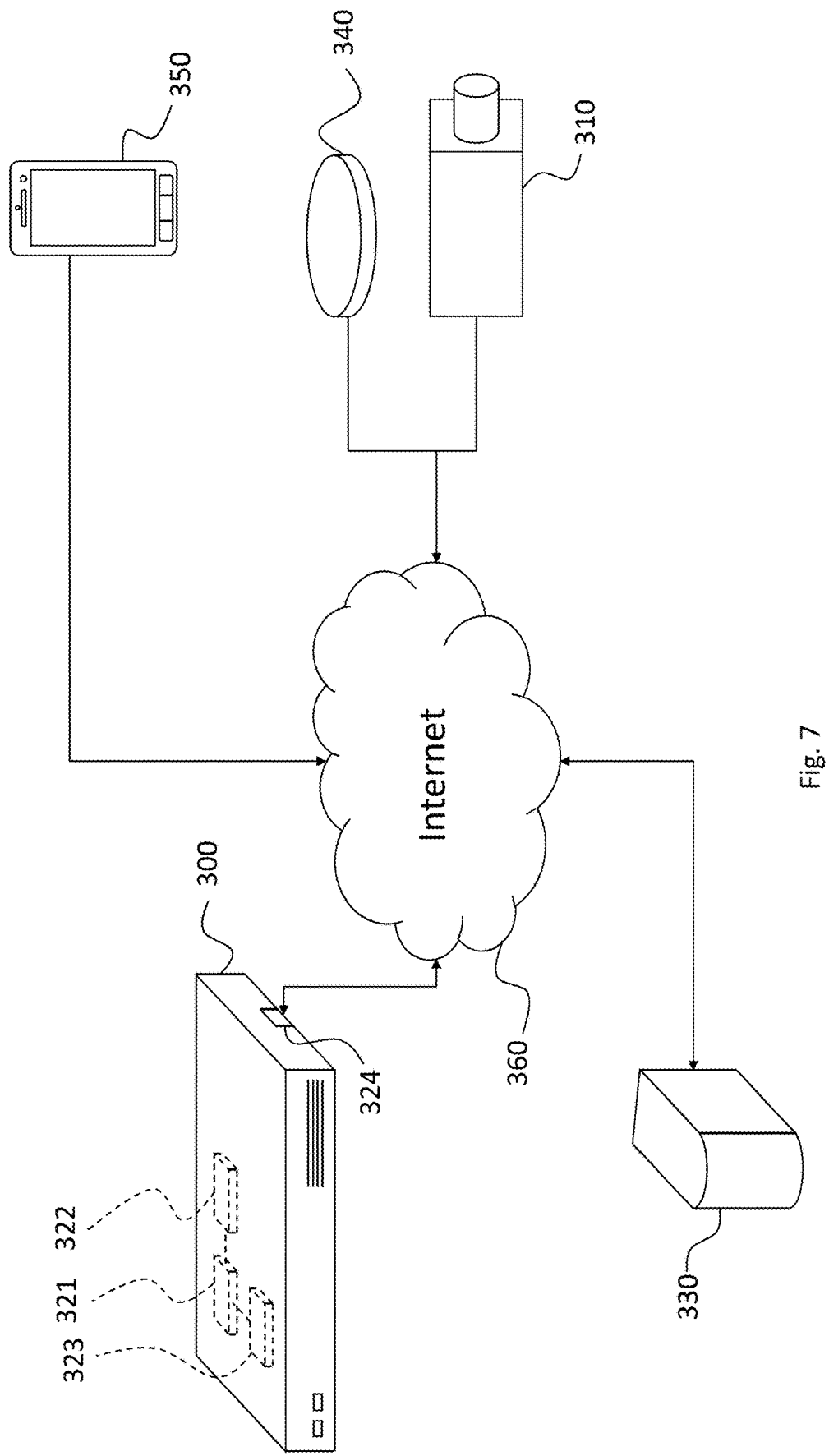
FIG. 7 is a schematic diagram of a cloud recording server according to one embodiment of the invention.

Please refer to FIG. 7, which is a schematic diagram of a cloud recording server according to one embodiment of the invention. The cloud recording server 300 is used to receive an audiovisual streaming data from an image source device 310. The cloud recording server 300 includes a capture unit 321, a conversion unit 322, and a communication port 324. The capture unit 321 at least captures a partial audiovisual streaming data according to at least one recording time parameter. The conversion unit 322 converts the partial audiovisual streaming data into a captured file. The communication port 324 is connected to a communication network 360 (e.g. the Internet or local area network) via wired connection or wireless connection for receiving the audiovisual streaming data. The cloud recording server 300 transmits the captured file to a remote storage device 330.

In the cloud recording server 300, each of the recording time parameter includes one recording time segment. The conversion unit 322 converts the captured audiovisual streaming data into a video file according to the recording time segment, and the captured file is the converted video file. The recording time segment includes a capture start point and a capture end point. The capture start and end points can be set by the user or can be preset/preinstalled in the cloud recording server 300. The content of setting the capture start and end points are similar to those related to the cloud recording systems 100 and 200, and will not be repeated here.

The cloud recording server 300 of the present embodiment further includes a cache unit 323 for caching the received audiovisual streaming data. The capture unit 321 captures the partial audiovisual streaming data out of the cached audiovisual streaming data, and the conversion unit 322 converts the partial audiovisual streaming data into the captured file in video format. Furthermore, the cloud recording server 300 may delete a remaining audiovisual streaming data that situates outside any one of the recording time segments from the cache unit 323.

The cloud recording server 300 may be configured to receive an event message. The event message is generated by an event detector 340 as an event occurs. When the cloud recording server 300 receives the event message, the capture unit 321 captures the partial audiovisual streaming data in accordance with the recording time parameter.

The cloud recording server 300 may be further configured to receive at least one new recording time parameter from user input, and therefore the previously stored recording time parameter can be replaced. The new recording time parameter is received through the communication port 324 and can be provided by the user through a setup device 350 or through the Internet. The user can log in the cloud recording server 300 through the Internet to perform data input or various setup actions.

The cloud recording server 300 of the present embodiment is connected to the Internet through the communication port 324, and then further connected to the image source device 310, the remote storage device 330, the event detector 340, and the setup device 350. The user may connect to the cloud recording server 300 through the Internet as well, so as to perform various setup and management operations. In addition, the user may also access the captured file stored in the remote storage device 330 from the cloud recording server 300 through the Internet. In one embodiment, the setup device 350 may be a cell phone located in a public network, and the image source device 310 may be located in a private network. Therefore, a network address translation between the public network and the private network is required while attempting to establish a relay connection between the setup device 350 and the image source device 310. The cloud recording server 300 may be the relay server therebetween, so as to eliminate the necessity of using any specialty communication protocols. As a result, from a user's perspective, the usability and convenience of using the cloud recording server 300 are increased; and from a system's perspective, due to the fact that no specialty communication protocol is required, the complexity of system framework is reduced and the flexibility of system framework is increased.

According to the above-mentioned cloud recording server 300, the recording behavior is decided according to one or more recording time parameters stored in the cloud recording server 300. For example, the cloud recording server 300 may store three different recording time parameters which are respectively directed to the recording behavior related to the recording time segment T1 shown in FIG. 3, the recording behavior related to the recording time segment T2 shown in FIG. 4, and the recording behavior related to the event occurring time point $T_M$ shown in FIG. 6. In other words, FIG. 3, FIG. 4, and FIG. 6 can be regarded as embodiments of different recording time parameters of the same cloud recording server 300.

In the cloud recording system, cloud recording server, and cloud recording method according to the above-mentioned embodiments of the invention, at least one recording time parameter is stored and the recording behavior is decided according to the recording time parameter. The user can change the recording behavior based on practical needs, therefore increasing the usability of the cloud recording system. Further, by transmitting the captured file to the remote storage device, the third party can easily access and use the captured file, so the flexibility and convenience of using the captured file can be increased.

The ordinal numbers used in the detailed description and claims, such as "first", "second", "third", and "fourth", do not necessarily indicate their priority orders; on the contrary, they are merely intended to distinguish different elements. Although the method steps in the detailed description are marked with orderly reference numbers, they are not intended to limit the priorities of the steps. Unless otherwise explicitly provided in the claim language, the order of the method steps may be performed in any possible manner. It will be apparent to those skilled in the art that various modifications and variations can be made to the structure of the present invention without departing from the scope or spirit of the invention. In view of the foregoing, it is intended that the present invention covers modifications and variations of this invention, provided they fall within the scope of the following claims.

What is claimed is:

1. A cloud recording system, comprising:
an image source device for providing an audiovisual streaming data of a program, said audiovisual streaming data of the program comprising audio and images; and
a recording device connected to the image source device through a first internet connection for receiving the audiovisual streaming data of the program, wherein the recording device stores at least one recording time parameter being set up through a second internet connection, wherein the recording device comprises:
a capture unit for capturing partial audiovisual streaming data of the program in accordance with the at least one recording time parameter being set up through the second internet connection, wherein said partial audiovisual streaming data of the program includes audio and images received from the image source device, wherein said partial audiovisual streaming data of the program is obtained by combining a first portion of the audiovisual streaming data of the program that is continuously forward captured from an event occurring point to a capture start point and a second portion of the audiovisual streaming data of the program that is continuously backward captured form the event occurring point to a capture end point, wherein the capture start point is a time point earlier than the event occurring point and the capture end point is another time point later than the event occurring point; and
a conversion unit for converting said partial audiovisual streaming data of the program into a captured file, wherein the recording device is configured to transmit the captured file to a remote storage device for keeping the captured file.

2. The cloud recording system of claim 1, wherein the recording device stores a plurality of recording time parameters being set up through the second internet connection, and the recording device further comprises:
a cache unit for caching the audiovisual streaming data received by the recording device and the capture unit being configured to capture the partial audiovisual streaming data of the program out of the audiovisual streaming data cached by the cache unit;
wherein each of the plurality of recording time parameters comprises a recording time segment, and the conversion unit is configured to convert the partial audiovisual streaming data of the program into the captured file in accordance with each of the recording time segments, and the captured file is a video file.

3. The cloud recording system of claim 2, wherein the recording device is further configured to delete a remaining audiovisual streaming data from the cache unit after the partial audiovisual streaming data of the program is captured by the captured unit, wherein the remaining audiovisual streaming data situates outside any one of the recording time segments.

4. The cloud recording system of claim 2, wherein each of the recording time segments comprises a capture start point and a capture end point and the cloud recording system further comprises:

an event detector connected to the recording device through a fourth communication connection for generating an event message as an event occurs;

wherein each of the recording time segments further comprises an event occurring point which situates between the capture start point and the capture end point, and when the recording device receives the event message, the capture unit captures the partial audiovisual streaming data of the program in accordance with the event occurring point, the capture start point, and the capture end point.

5. The cloud recording system of claim 1, wherein the audiovisual streaming data of the program comprises a plurality of streaming data frames, and each of the streaming data frames comprises at least one I-frame, a plurality of P-frames, and a plurality of audio frames.

6. The cloud recording system of claim 1, further comprising:

a setup device for accepting an input of a new recording time parameter so as to replace the recording time parameter previously stored in the recording device, wherein the new recording time parameter is provided from the setup device to the recording device through the second internet connection.

7. The cloud recording system of claim 1, said image source device is a set-top box for cable television, a set-top box for receiving satellite signals, or a multimedia playback device.

8. A cloud recording method, comprising:

receiving an audiovisual streaming data of a program from an image source device through a first internet connection, said audiovisual streaming data of the program comprising audio and images;

capturing partial audiovisual streaming data of the program received through the first internet connection in accordance with at least one recording time parameter being setup set up through a second internet connection, wherein said partial audiovisual streaming data of the program includes audio and images, wherein each of the at least one recording time parameter comprises a recording time segment comprising a capture start point and a capture end point;

converting said partial audiovisual streaming data of the program into a captured file; and transmitting the captured file to a remote storage device, wherein the method further comprises caching the audiovisual streaming data received in the receiving step, wherein the capture start point is a time point earlier than an event occurring point and the capture end point is another time point later than the event occurring point, wherein the capturing step further comprises:

continuously forward capturing the audiovisual streaming data from the event occurring point to the capture start point;

continuously backward capturing the audiovisual streaming data from the event occurring point to the capture end point; and combining the audiovisual streaming data captured in the continuously forward capturing step and the audiovisual streaming data captured in the continuously backward capturing step to form the partial audiovisual streaming data of the program.

9. The cloud recording method of claim 8, further comprising:

deleting a remaining audiovisual streaming data after the partial audiovisual streaming data of the program is captured, wherein the remaining audiovisual streaming data situates outside any one of the recording time segments.

10. The cloud recording method of claim 8, wherein the audiovisual streaming data of the program comprises a plurality of streaming data frames and the partial audiovisual streaming data of the program comprises at least one of said streaming data frames, and in the converting step, the partial audiovisual streaming data is converted into a video file.

11. The cloud recording system of claim 8, said image source device is a set-top box for cable television, a set-top box for receiving satellite signals, or a multimedia playback device.

12. A cloud recording server, for receiving an audiovisual streaming data of a program from an image source device through a first internet connection, said audiovisual streaming data of the program comprising audio and images, wherein the cloud recording server stores at least one recording time parameter being set up through a second internet connection, wherein the cloud recording server comprises:

a capture unit for capturing partial audiovisual streaming data of the program received through the first internet connection in accordance with at least one recording time parameter being set up through the second internet connection, wherein said partial audiovisual streaming data of the program includes audio and images received from the image source device, wherein said partial audiovisual streaming data of the program is obtained by combining a first portion of the audiovisual streaming data of the program that is continuously forward captured from an event occurring point to a capture start point and a second portion of the audiovisual streaming data of the program that is continuously backward captured form the event occurring point to a capture end point, wherein the capture start point is a time point earlier than the event occurring point and the capture end point is another time point later than the event occurring point;

a conversion unit for converting said partial audiovisual streaming data of the program into a captured file; and a communication port connected to a communication network for transmitting the captured file to a remote storage device.

13. The cloud recording server of claim 12, wherein the capture unit is configured to capture the partial audiovisual streaming data of the program in accordance with a plurality of said recording time parameter, and the cloud recording server further comprises:

a cache unit for caching the audiovisual streaming data received by the cloud recording server and the capture unit being configured to capture the partial audiovisual streaming data of the program out of the audiovisual streaming data cached by the cache unit;

wherein each of the recording time parameters comprises a recording time segment and the conversion unit is configured to convert the partial audiovisual streaming data of the program into the captured file in accordance with each of the recording time segments, and the captured file is a video file.

14. The cloud recording server of claim 13, wherein the cloud recording server is further configured to delete a remaining audiovisual streaming data from the cache unit after the partial audiovisual streaming data of the program is captured by the capture unit, wherein the remaining audiovisual streaming data situates outside any one of the recording time segments.

15. The cloud recording server of claim 12, wherein the cloud recording server is further configured to accept an input of at least one new recording time parameter so as to replace the recording time parameter previously stored in the cloud recording server.

16. The cloud recording system of claim 12, said image source device is a set-top box for cable television, a set-top box for receiving satellite signals, or a multimedia playback device.

* * * * *